United States Patent
Na et al.

(10) Patent No.: US 10,648,379 B2
(45) Date of Patent: May 12, 2020

(54) APPARATUS FOR DISCHARGING WATER IN EXHAUST FLUID AND SILENCER FOR FUEL CELL VEHICLE

(71) Applicants: HYUNDAI MOTOR COMPANY, Seoul (KR); KIA Motors Corporation, Seoul (KR)

(72) Inventors: Sung Wook Na, Yongin-si (KR); Hun Woo Park, Namyangju-si (KR); Myung Ju Jung, Daejeon (KR); Hyun Young Park, Yongin-si (KR); Ju Chan Jang, Yongin-si (KR); Jun Ho Jang, Yongin-si (KR)

(73) Assignees: HYUNDAI MOTOR COMPANY, Seoul (KR); KIA Motors Corporation, Seoul (KR)

( * ) Notice: Subject to any disclaimer, the term of this patent is extended or adjusted under 35 U.S.C. 154(b) by 126 days.

(21) Appl. No.: 15/827,838

(22) Filed: Nov. 30, 2017

(65) Prior Publication Data
US 2018/0171842 A1    Jun. 21, 2018

(30) Foreign Application Priority Data
Dec. 15, 2016   (KR) .................... 10-2016-0171970

(51) Int. Cl.
*F01N 3/02* (2006.01)
*F01N 3/00* (2006.01)
*B60L 50/72* (2019.01)

(52) U.S. Cl.
CPC .............. *F01N 3/005* (2013.01); *B60L 50/72* (2019.02); *B60L 2270/12* (2013.01);
(Continued)

(58) Field of Classification Search
CPC ....... F02B 29/0468; B60L 50/72; F01N 3/005
(Continued)

(56) References Cited

U.S. PATENT DOCUMENTS 5,989,318 A * 11/1999 Schroll .............. B01D 19/0031
                                                  95/241
8,227,129 B2 * 7/2012 Tseng .................... B82Y 30/00
                                                  429/209
(Continued)

FOREIGN PATENT DOCUMENTS

KR          10-1592646 B1      2/2016

*Primary Examiner* — Jason D Shanske
(74) *Attorney, Agent, or Firm* — McDonnell Boehnen Hulbert & Berghoff LLP

(57) ABSTRACT

An apparatus for discharging water in exhaust fluid is disclosed. The apparatus includes a body having an inlet disposed on an exhaust path for exhausting exhaust fluid exhausted from a fuel cell stack to the outside and through which the exhaust fluid is introduced, an outlet communicating with the outside, an interior space allowing the inlet and the outlet to communicate each other, and a discharge passage communicating with the outside to discharge water in the interior space. The apparatus further includes a first resistance unit disposed on a flow path along which the exhaust fluid flows in the interior space and having first fine holes through which at least a portion of the exhaust fluid passes, and a second resistance unit disposed on a discharge path along which the water in the interior space is discharged through the discharge passage and having second fine holes through which the water passes.

9 Claims, 3 Drawing Sheets

(52) U.S. Cl.
CPC ..... *B60L 2270/142* (2013.01); *F01N 2570/22* (2013.01); *Y02T 10/20* (2013.01)

(58) Field of Classification Search
USPC .......................................................... 60/309
See application file for complete search history.

(56) References Cited

U.S. PATENT DOCUMENTS

2016/0341107 A1* 11/2016 Dieterle ............... B01D 53/261
2017/0022886 A1* 1/2017 Dieterle ............... F02B 29/045
2019/0024550 A1* 1/2019 Curras-Guede ........ F02M 26/23

* cited by examiner

APPARATUS FOR DISCHARGING WATER IN EXHAUST FLUID AND SILENCER FOR FUEL CELL VEHICLE

CROSS-REFERENCE TO RELATED APPLICATION

This application is based on and claims the benefit of priority to Korean Patent Application No. 10-2016-0171970, filed on Dec. 15, 2016, in the Korean Intellectual Property Office, the disclosure of which is incorporated herein in its entirety by reference.

TECHNICAL FIELD

The present disclosure relates to an apparatus for discharging water in exhaust fluid and a silencer for a fuel cell vehicle.

BACKGROUND

In general, a fuel cell vehicle produces water through a hydrogen reaction in a fuel cell stack.

Exhaust fluid (hydrogen, air, and vapor) discharged from the fuel cell stack flows through an exhaust line.

The exhaust fluid is not problematic during driving of the vehicle, but is discarded to a parking lot in a startup-off state of the vehicle.

In particular, if a compressor is operated and residual water in the stack is discharged when the startup of the vehicle is off at a low temperature, for example, in the winter season, water of a high pressure is ejected through the exhaust line and the bottom of the parking lot is contaminated (water is collected), doing harm to a peripheral area of the vehicle.

Accordingly, a need exists for an apparatus for discharging water while the vehicle travels on a road by using a discharge back pressure.

SUMMARY

The present disclosure provides an apparatus for discharging water in exhaust fluid that may prevent exhaust fluid from being discharged to an exhaust line to increase pressure in the exhaust line by using a discharge back pressure, and a silencer for a fuel cell vehicle.

The present disclosure also provides an apparatus for discharging water in exhaust fluid that may discharge water to a road by adjusting an amount of discharged exhaust fluid according to an operation speed of the user, and a silencer for a fuel cell vehicle.

The present disclosure also provides an apparatus for discharging water in exhaust fluid in which an exhaust fluid discharging structure and a silencer may be separated, and a silencer for a fuel cell vehicle.

The technical objects of the present disclosure are not limited to the above-mentioned one, and the other unmentioned technical objects will become apparent to those skilled in the art from the following description.

In accordance with an aspect of the present disclosure, there is provided an apparatus for discharging water in exhaust fluid, the apparatus including a body having an inlet disposed on an exhaust path for exhausting exhaust fluid exhausted from a fuel cell stack to the outside and through which the exhaust fluid is introduced, an outlet communicating with the outside, an interior space allowing the inlet and the outlet to communicate each other, and a discharge passage communicating with the outside to discharge water in the interior space, a first resistance unit disposed on a flow path along which the exhaust fluid flows in the interior space and having first fine holes through which at least a portion of the exhaust fluid passes, and a second resistance unit disposed on a discharge path along which the water in the interior space is discharged through the discharge passage and having second fine holes through which the water passes.

In accordance with another aspect of the present disclosure, there is provided a silencer for a fuel cell vehicle, including a main body having an inlet disposed on an exhaust path for exhausting exhaust fluid exhausted from a fuel cell stack to the outside and through which the exhaust fluid is introduced, an outlet communicating with the outside, and an interior space allowing the inlet and the outlet to communicate each other, a first resistance unit disposed on a flow path along which the exhaust fluid flows in the interior space, separating the interior space into a first space that is adjacent to the inlet and a second space that is adjacent to the outlet, and having first fine holes through which at least a portion of the exhaust fluid passes from the first space to the second space, and a noise absorbing unit provided in the second space to reduce noise by the exhaust fluid.

BRIEF DESCRIPTION OF THE DRAWINGS

Exemplary aspects are illustrated in the drawings. It is intended that the embodiments and figures disclosed herein are to be considered illustrative rather than restrictive.

DETAILED DESCRIPTION

Figure 1:
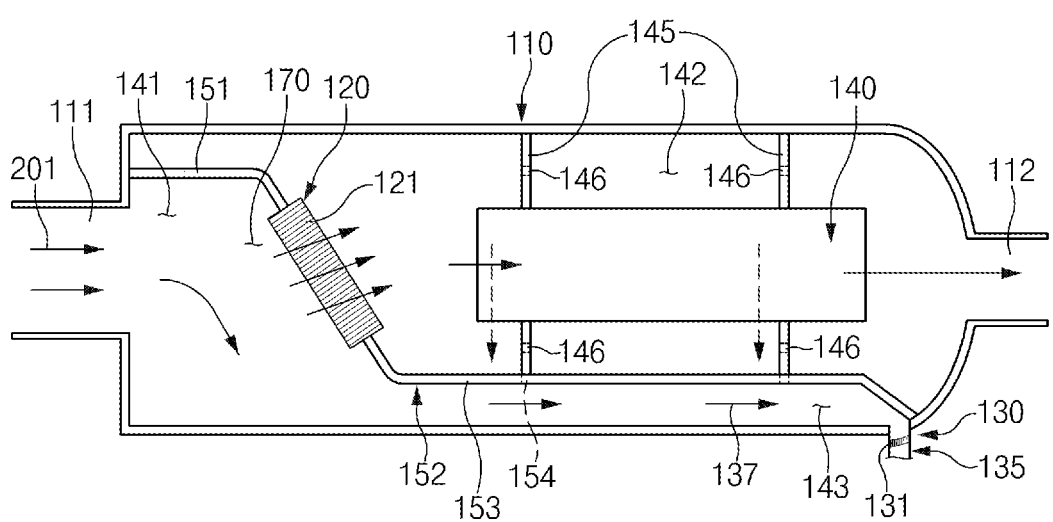
FIG. 1 shows a silencer for a fuel cell vehicle according to a first embodiment of the present disclosure.

Hereinafter, exemplary embodiments of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

FIG. 1 is a view of a silencer for a fuel cell vehicle according to a first embodiment of the present disclosure. As illustrated in FIG. 1, the silencer 100 for a fuel cell vehicle includes a main body 110, a first resistance unit 120, and a noise absorbing unit 140.

First, the main body 110 will be described. The main body 110 may be disposed in an exhaust path for exhausting exhaust fluid 201 exhausted from a fuel cell stack to the outside (i.e., open air). The main body 110 may have an inlet 111 through which the exhaust fluid 201 is introduced, an outlet 112 communicating with the outside, and an interior space 170 allowing the inlet 111 and the outlet 112 to communicate with each other.

The first resistance unit 120 may be disposed on a flow path along which the exhaust fluid 201 flows in the interior space 170 of the main body 110. The interior space 170 may be classified into a first space 141 that is adjacent to the inlet 111 and a second space 142 that is adjacent to the outlet 112. The first resistance unit 120 may have first fine holes 121 through which at least a portion of the exhaust fluid 201 passes from the first space 141 towards the second space 142.

The first fine holes 121 may be sized to provide a resistance against passage of water in the exhaust fluid 201 such that at least a portion of the water in the exhaust fluid 201 is separated from the exhaust fluid while the exhaust fluid 201 passes through the first fine holes 121. As an example, the sizes of the first fine holes 121 may be 150 μm to 500 μm.

The noise absorbing unit 140 may be provided in the second space 142, and may be configured to reduce noise by the exhaust fluid 201.

As an example, the noise absorbing unit 140 may be disposed in a flow direction of the exhaust fluid flowing from the inlet 111 towards the outlet 112. As an example, the noise absorbing unit 140 may have a cylindrical shape. An acoustic absorbent may be provided inside the noise absorbing unit 140. Noise may be absorbed to be damped while the exhaust fluid 201 flows. As an example, the noise absorbing unit 140 may have a plurality of punch holes.

The main body 110 may have a discharge passage 135 communicating with the outside such that the water in the interior space 170 is discharged.

The silencer for a fuel cell vehicle according to the present embodiment may further include a second resistance unit 130. The second resistance unit 130 may be disposed on a discharge path 137 along which the water in the interior space 170 is discharged through the discharge passage 135.

The second resistance unit 130 may be configured to have second fine holes 131 through which water passes.

The second fine holes 131 may be sized to provide a resistance against passage of water when water passes through the second fine holes 131. As an example, the sizes of the second fine holes 131 may be 120 μm to 200 μm.

The second fine holes 131 may be sized to allow water to pass when a pressure which the exhaust fluid 201 applies to the water towards the discharge passage 135 is a reference pressure or higher.

Here, the reference pressure may be set to a pressure at which the exhaust fluid 201 pressurizes the water towards the discharge passage 135 in the interior space 170 when the vehicle driven by the fuel cell stack travels at a reference speed.

As an example, when the vehicle travels at about 40 km or higher, the water may pass through the second fine holes 131 and be discharged to the outside as the pressure applied towards the discharge passage 135 becomes higher while the compressor (not illustrated) disposed on the exhaust path is operated.

Accordingly, because the amount of discharged exhaust fluid is adjusted according to an operation speed of the vehicle by a user, a pressure of the exhaust path may be prevented from increasing.

The silencer for a fuel cell vehicle according to the present embodiment may further include an upper support 151 and a lower support 152.

The upper support 151 may be connected to at least one of the inner surfaces of the main body 110. The upper support 151 may be configured to support an upper side of the first resistance unit 120.

The lower support 152 may be connected to at least one of the inner surfaces of the main body 110 to support a lower side of the first resistance unit 120.

The lower support 152 may include an extension 153. The extension 153 may extend close to the outlet 112 in a direction away from the inlet 111. The extension 153 may have a connection hole 154 such that the liquid flowing through the noise absorbing unit 140 drops to a storage space 143, which will be described below.

The first space 141 may include a storage space 143 defined by the inner surface of the main body 110, which faces the extension 153. A discharge passage 135 may be provided on a side which is closer to the storage space 143. The water in the interior space 170 may be stored in the storage space 143 before being discharged through the discharge passage 135.

The silencer for a fuel cell vehicle according to the present embodiment may further include a baffle unit 145. The baffle unit 145 may extend in a direction that crosses a flow of the exhaust fluid 201 in the second space 142 to induce collision with the water in the exhaust fluid 201.

The baffle unit 145 may be configured to introduce the water dropping to the lower side due to the collision into the storage space 143. As an example, a plurality of holes 146 may be formed in the baffle unit 145. The baffle unit 145 may be configured to reduce noise by the exhaust fluid 201. The baffle unit 145 may be disposed behind the noise absorbing unit 140 facing the inlet 111. As an example, when the exhaust gas fails to pass through the interior of the noise absorbing unit 140, the remaining exhaust gases may pass through the holes 146 of the baffle unit 145 and flow to the outlet 112.

Figure 2:
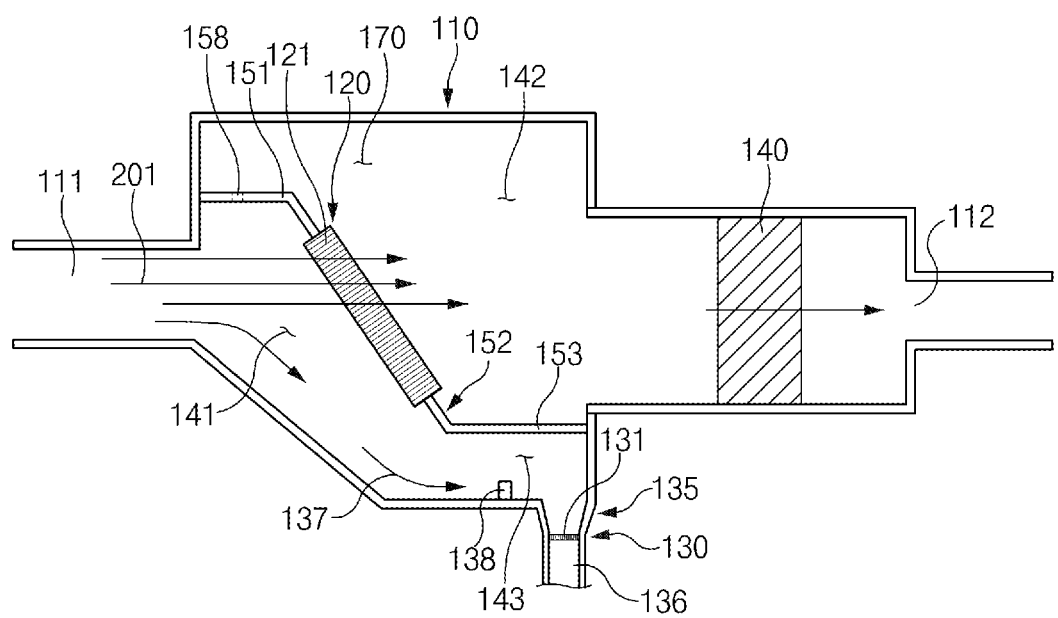
FIG. 2 illustrates another embodiment of FIG. 1.

FIG. 2 illustrates another embodiment of FIG. 1. FIG. 2 includes a different noise absorbing unit 140 than FIG. 1. Hereinafter, the same reference numerals will be used for the same elements, and a repeated description thereof will be omitted.

Referring to FIG. 2, another embodiment of a silencer 200 is shown. As an example, in order that the noise absorbing unit 140 absorbs noise while the exhaust fluid 201 flows, the interior space 170 may become smaller as it goes towards the outlet 112. The noise absorbing unit 140 may be disposed adjacent to the outlet 112, and the noise absorbing unit 140 may be disposed along a circumference of the interior space 170 that is adjacent to the outlet 112.

However, the interior space 170 is not limited thereto; the interior space 170 may have the same size throughout the inlet 111 and the outlet 112, and the noise absorbing unit 140 may be disposed along the circumference of the interior space 170.

Figure 3:
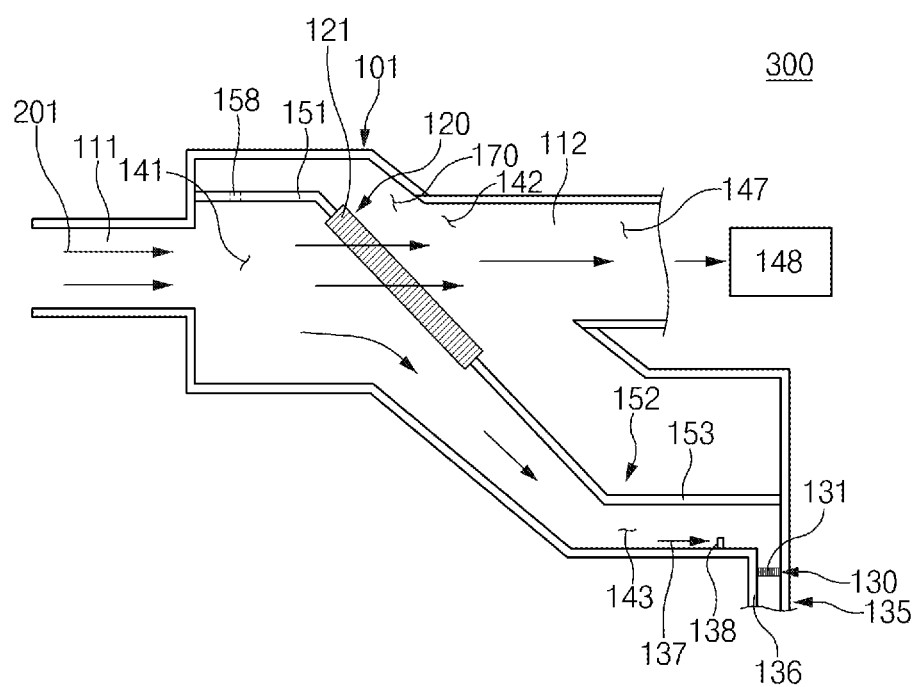
FIG. 3 shows an apparatus for discharging water in exhaust fluid according to a second embodiment of the present disclosure.

FIG. 3 is a view of an apparatus for discharging water in exhaust fluid according to a second embodiment of the present disclosure. As illustrated in FIG. 3, the apparatus for discharging water in exhaust fluid may be configured such that a silencer and a body are separated.

As illustrated in FIG. 3, the apparatus 300 for discharging water in exhaust fluid includes a body 101, a first resistance unit 120, and a second resistance unit 130.

The body 101 may be disposed in an exhaust path for exhausting exhaust fluid 201 exhausted from a fuel cell stack to the outside. The body 101 may have an inlet 111 through which exhaust fluid 201 is introduced, an outlet 112 communicating with a silencer 148 configured to reduce noise by the exhaust fluid 201, an interior space 170 allowing the inlet 111 and the outlet 112 to communicate with each other, and a discharge passage 135 communicating with the outside to discharge water in the interior space 170.

The first resistance unit 120 may be disposed on a flow path along which the exhaust fluid 201 in the interior space 170 flows. The first resistance unit 120 may be configured to have first fine holes 121 through which at least a portion of the exhaust fluid 201 passes.

The exhaust fluid 201 that passed through the first fine holes 121 may flow to the silencer 148 along a noise path 147.

The first resistance unit 120 may decline in a direction away from the inlet 111.

The first fine holes 121 may be sized to provide a resistance against passage of water in the exhaust fluid 201 such that at least a portion of the water in the exhaust fluid 201 is separated from the exhaust fluid 201 while the exhaust fluid 201 passes through the first fine holes 121.

As an example, the sizes of the first fine holes 121 may be about 150 μm to 500 μm.

The second resistance unit 130 may be disposed on a discharge path 137 along which the water in the interior space 170 is discharged through the discharge passage 135. The second resistance unit 130 may be configured to have second fine holes 131 through which water passes.

The second fine holes 131 may be sized to provide a resistance against passage of water when water passes through the second fine holes 131.

The second fine holes 131 may be sized to allow water to pass when a pressure which the exhaust fluid 201 applies to the water towards the discharge passage 135 in the interior space 170 is a reference pressure or higher. As an example, the sizes of the second fine holes 131 may be about 120 μm to 200 μm.

Here, the reference pressure may be set to a pressure at which the exhaust fluid 201 pressurizes the water towards the discharge passage 135 in the interior space 170 when the vehicle driven by the fuel cell stack travels at a reference speed.

As an example, in the case of a reference speed or higher, the water may pass through the second resistance unit 130, and in the case of not more than the reference speed, the water cannot pass through the second resistance unit 130.

The discharge passage 135 may have a discharge part 136. The discharge part 136 may extend downwards in the interior space 170 or be inclined downwards in the interior space 170 in a direction that becomes far away from the inlet 111 to communicate with the outside at a lower end thereof. The second resistance part 130 may be provided in the discharge part 136.

The second fine holes 131 may be sized to allow the water to pass when the weight of the water collected on the upper side of the second resistance unit 130 is a reference weight or more. As an example, the reference weight may be the weight of the water corresponding to the volume of about 10% or more height from the lower end surface of the body 101.

The apparatus for discharging water in the exhaust fluid 201 according to the present embodiment may further include an upper support 151 and a lower support 152. The upper support 151 may be connected to at least one of the inner surfaces of the body 101 defining the interior space 170 to support an upper side of the first resistance unit 120.

The lower support 152 may be connected to at least one of the inner surfaces of the body 101 defining the interior space 170 to support a lower side of the first resistance unit 120.

Here, the interior space 170 may be separated into a first space 141 that is adjacent to the inlet 111 and a second space 142 that is adjacent to the outlet 112, by the upper support 151, the first resistance unit 120, and the lower support unit 152.

The upper support 151 may have a detour passage 158. The detour passage may be configured to allow the first space 141 and the second space 142 to communicate each other such that the exhaust fluid 201 in the first space 141 flows to the second space 142 while not passing through the first fine holes 121 of the first resistance unit 120.

As an example, the detour passage 158 may be configured to disperse the exhaust fluid 201 such that pressure is not concentrated on one side. The detour passage 158 may be configured to reduce the pressure of the first space 141.

The lower support 152 may include an extension 153 extending in a direction away from the inlet 111.

The first space 141 may include an extension 153, and a storage space 143 defined by the inner surface of the body 101, which faces the extension 153. The discharge passage 135 may be provided on a side that is close to the storage space 143, and the water in the interior space 170 may be stored in the storage space 143 through the discharge passage 135, before being discharged.

Here, the apparatus for discharging water in exhaust fluid 201 may include a protrusion 138 to prevent flows of the water such that the water corresponding to a reference amount or less does not flow to the discharge passage 135.

The protrusion 138 may be provided in front of the discharge passage 135 with respect to the discharge path 137.

The protrusion 138 may protrude by a specific height from an inner surface of the body 101 facing the extension 153 towards the extension 153.

The protrusion 138 may be configured to prevent the water corresponding to the reference amount from flowing to the discharge passage 135.

Accordingly, as the amount of discharged exhaust fluid 201 is adjusted according to operation speed of the vehicle by a user, the water may be discharged to a road and the pressure in the exhaust path may be prevented, making it possible to optically maintain the performance of the stack during driving of the vehicle.

Accordingly, because the exhaust fluid may be discharged to the outside by a discharge back pressure, the pressure in the exhaust line may be prevented from increasing, making it possible to optimally maintain the performance of the stack.

Further, because the amount of discharged exhaust fluid may be adjusted according to the operation speed of the user, water may be discharged to the road during driving of the vehicle.

Further, the number of components and manufacturing costs may be reduced by separating the discharge structure of the exhaust fluid and the silencer.

While a number of exemplary aspects have been discussed above, those of skill in the art will recognize that still further modifications, permutations, additions and sub-combinations thereof of the disclosed features are still possible. It is therefore intended that the following appended claims and claims hereafter introduced are interpreted to include all such modifications, permutations, additions and sub-combinations as are within their true spirit and scope.

What is claimed is:

1. An apparatus for discharging water in exhaust fluid, the apparatus comprising:
a body having an inlet disposed on an exhaust path for exhausting exhaust fluid exhausted from a fuel cell stack to an outside of a vehicle and through which the exhaust fluid is introduced, an outlet communicating with the outside, an interior space allowing the inlet and the outlet to communicate with each other, and a discharge passage communicating with the outside to discharge water in the interior space;

a first filter disposed on a flow path along which the exhaust fluid flows in the interior space and having first fine holes through which at least a portion of the exhaust fluid passes;

a second filter disposed on a discharge path along which the water in the interior space is discharged through the discharge passage and having second fine holes through which the water passes;

an upper support connected to at least one of the inner surfaces of the body defining the interior space to support an upper side of the first filter; and a lower support connected to at least one of the inner surfaces of the body defining the interior space to support a lower side of the first filter;

wherein the interior space is separated into a first space communicating with the inlet and a second space communicating with the outlet by the upper support, the first filter, and the lower support; and wherein the upper support has a detour passage allowing the first space and the second space to communicate with each other such that the exhaust fluid in the first space flows to the second space while not passing through the first fine holes of the first filter.

2. The apparatus of claim 1, wherein the first fine holes are sized to provide a resistance against passage of the water in the exhaust fluid such that at least a portion of the water in the exhaust fluid is separated from the exhaust fluid while the exhaust fluid passes through the first fine holes.

3. The apparatus of claim 1, wherein the second fine holes are sized to provide a resistance against passage of the water when the water passes through the second fine holes.

4. The apparatus of claim 3, wherein the second fine holes are sized to allow passage of water when a pressure which the exhaust fluid applies to the water towards the discharge passage in the interior space is a reference pressure or higher.

5. The apparatus of claim 4, wherein the reference pressure is set to a pressure which the exhaust fluid applies to the water towards the discharge passage in the interior space when a vehicle driven by the fuel cell stack is operated at a reference speed.

6. The apparatus of claim 3, wherein the discharge passage has a discharge part extending downwards in the interior space or declining in the interior space in a direction away from the inlet to communicate with the outside at a lower end thereof, wherein the second filter is provided in the discharge part, and wherein the second fine holes are sized to allow passage of the water when the weight of the water collected on an upper side of the second filter is a reference weight or more.

7. The apparatus of claim 5, wherein the first filter declines in a direction away from the inlet.

8. The apparatus of claim 7, wherein the lower support includes an extension extending away from the inlet, wherein the first space includes a storage space defined by the extension and at least one of the inner surfaces of the body which faces the extension, wherein the discharge passage is provided on a side that is close to the storage space, and wherein the water in the interior space is stored in the storage space before being discharged through the discharge passage.

9. The apparatus of claim 8, wherein the inner surface of the body which faces the extension includes a protrusion protruding by a specific height towards the extension, and wherein the protrusion is provided in front of the discharge passage with respect to the discharge path to prevent flows of the water such that the water corresponding to a reference amount or less does not flows to the discharge passage.

* * * * *